United States Patent [19]

Stevens, Jr. et al.

[11] Patent Number: 4,800,957
[45] Date of Patent: Jan. 31, 1989

[54] RECOVERING HYDROCARBONS WITH A MIXTURE OF CARBON DIOXIDE AND ALCOHOL

[75] Inventors: James F. Stevens, Jr., Houston, Tex.; Jeffrey T. Hawkins, Ponca City, Okla.

[73] Assignee: Texaco Inc., White Plains, N.Y.

[21] Appl. No.: 79,385

[22] Filed: Jul. 30, 1987

[51] Int. Cl.$^4$ ............................................. E21B 43/22
[52] U.S. Cl. ................................. 166/268; 252/8.554
[58] Field of Search ............ 166/268, 273, 274, 305.1; 252/8.554

[56] References Cited

U.S. PATENT DOCUMENTS

| | | | |
|---|---|---|---|
| 3,334,688 | 8/1967 | Blackwell et al. | 166/273 |
| 3,623,552 | 11/1971 | Vairogs | 166/268 X |
| 3,811,502 | 5/1974 | Burnett | 166/252 |
| 3,811,503 | 5/1974 | Burnett et al. | 166/252 |
| 4,502,538 | 3/1985 | Wellington et al. | 166/252 |
| 4,609,043 | 4/1986 | Cullick | 166/268 |
| 4,617,996 | 10/1986 | Shu | 166/273 |

*Primary Examiner*—George A. Suchfield
*Attorney, Agent, or Firm*—Jack H. Park; Kenneth R. Priem; Harold J. Delhommer

[57] ABSTRACT

The invention is a method of recovering hydrocarbons from underground hydrcarbon formations by injecting a mixture of carbon dioxide and a polar alcohol or polar glycol additive, said additive having less than about 9 carbon atoms. The mixture of carbon dioxide and additive is injected at a temperature and pressure above the critical temperature and pressure of carbon dioxide. The alcohol or glycol additive comprises about 0.1% to about 10% by weight of the injected mixture. After being injected through an injection well, the mixture is driven through the formation and the hydrocarbons and other fluids are recovered at one or more production wells.

9 Claims, No Drawings

RECOVERING HYDROCARBONS WITH A MIXTURE OF CARBON DIOXIDE AND ALCOHOL

BACKGROUND OF THE INVENTION

This invention relates to an enhanced oil recovery method for improving hydrocarbon recovery. More particularly, the invention is a method of increasing carbon dioxide viscosity in a carbon dioxide flood.

The injection of carbon dioxide into underground reservoirs has become one of the chief methods of enhanced oil recovery practiced in the field. A wide variety of carbon dioxide injection schemes have been tried ranging from flooding under miscible to conditionally miscible to immiscible conditions. Injection schemes have also been applied in a cyclic injection and production fashion on single wells as well as in a flood front driving carbon dioxide through a reservoir from injection to production wells.

Although laboratory miscible slim tube floods have generally displaced over 90% of crude oil in slim tubes, and immiscible laboratory core floods have achieved recoveries nearly as great, recovery efficiencies in the field have been much lower. As in other methods of sweeping reservoirs, such as water flooding, steam flooding and surfactant flooding, sweep efficiencies in the field are relatively low due to a lack of reservior homogenity and viscosity differences between the flooding medium and the underground hydrocarbons.

These problems have been decreased for aqueous floods by the addition of water soluble polymers such as polysaccharides and polyacrylamides to increase flood viscosity. Similar approaches have been tried with hydrocarbon and carbon dioxide floods with generally poor results.

The New Mexico Petroleum Recovery Research Center has performed tests with the use of high molecular weight polymers for increasing carbon dioxide viscosity. Extensive testing on a number of commercially available polymers has failed to find a solution. High molecular weight polymers do not have a sufficient solubility to alter carbon dioxide viscosity. These tests have been reported in Heller, J. P., Dandge, D. K., Card, R. G., and Donaruma, L. G., "Direct Thickeners for Mobility Control of $CO_2$ Floods," SPE Journal, October 1985.

Reseachers at the New Mexico Petroleum Recovery Research Center have, however, found a class of compounds which gives substantial viscosity increases to alkane solvents by forming associations with large numbers of molecules. The organo-tin fluorides, such as tributyl-tin fluoride and diamylbutyl-tin fluoride can substantially increase the viscosity of hydrocarbon solvents. Please see, U.S. Pat. No. 4,607,696 and Dunn, P. and Oldfield, D., "Tri-n-Butyl Tin Fluoride. Novel Coordination Polymer in Solution," Journal of Macromolecular Science, Vol. A4(5), pg. 1160–76 (1970).

Two publications have noted relatively large increases in carbon dioxide densities with the addition of relatively low molecular weight compounds. These publications did not, however, mention viscosity. See Paulaitis, M. E., Penninger, J.M.L., Gray, Jr., R.D., and Davidson, P., Chemical Engineering at Supercritical Fluid Conditions, Ann Arbor Science, pg. 31–80 (1983); and Snedaker, R.A., Ph.D. Thesis entitled "Phase Equilibrium In Systems with Supercritical Carbon Dioxide," Princeton University (1957).

The ability to predict the viscosity of a carbon dioxide and decane mixture by two correlations between density and viscosity was compared with actual measurements in Cullick, A. S. and Mathis, M.L., Journal of Chemical Engineering Data, Vol. 29, pg. 393–6, (1984).

SUMMARY OF THE INVENTION

The invention is a method of recovering hydrocarbons from underground hydrocarbon formations by injecting a mixture of carbon dioxide and a polar alcohol or polar glycol additive, said additive having less than abut 9 carbon atoms. The mixture of carbon dioxide and additive is injected at a temperature and pressure above the critical temperature and pressure of carbon dioxide. The alcohol or glycol additive comprises about 0.1% to about 10% by weight of the injected mixture. After being injected through an injection well, the mixture is driven through the formation and the hydrocarbons and other fluids are recovered at one or more production wells.

DETAILED DESCRIPTION

The instant invention provides a method of increasing oil recovery in carbon dioxide floods, regardless of whether the carbon dioxide flooding is conducted under miscible, conditionally miscible, or immiscible conditions. Since carbon dioxide has a relatively low viscosity compared to most hydrocarbons, carbon dioxide as a flooding medium tends to bypass a considerable portion of underground hydrocarbons. In order to reduce carbon dioxide fingering through a hydrocarbon reservoir, the frontal advance of a carbon dioxide flood must be reduced to a critical velocity lower than other flooding mediums such as water or steam. But an increase in the viscosity of carbon dioxide means that the critical velocity of the flood front, the limiting speed at which a front can advance without significant fingering, is higher and the flood can be conducted faster and at less cost.

It has been discovered that the addition of about 0.1% to about 10%, preferrably about 1% to about 4% by weight, of a polar alcohol or polar glycol to carbon dioxide increases the viscosity of the carbon dioxide mixture. The mixture is injected at a supercritical temperature and pressure above the critical temperature and pressure of carbon dioxide, 31° C. and 72.9 atmospheres.

The polar alcohols and glycols which may be employed as invention additives include methanol, ethanol, propanol, isopropanol, butanol, isobutanol, pentanol, hexanol, heptanol, octanol, ethylene glycol, propylene glycol, butylene glycol, diethylene glycol, and related homologues and derivatives. As cost is a prime consideration for any material injected underground in an enhanced oil recovery flood, the cheapest invention additives, methanol, ethanol and ethylene glycol are preferred. Because of its carbon dioxide viscosity enhancing capabilities, ethylene glycol is the most preferred additive. Of course, if the price of carbon dioxide increases relative to the cost of these additives, then larger quantities of viscosity enhancing additives can be economically employed. Two or more additives may be also placed in the mixture to enhance the viscosity of carbon dioxide in a ternary system.

It is believed that the polar alcohols and glycols mentioned above are effective in increasing carbon dioxide viscosity due in part to their polar structure. Such structure is believed to be responsible for dipolar bonding between molecules. It is also believed that glycols in general are more effective visosity enhancing additives due to their extra hydroxyl group as compared to the other polar alcohols. In addition, ethylene glycol has a substantially higher dipole moment than the lower alcohols mentioned above.

Since the carbon dioxide and alcohol mixture is injected at a supercritical temperature and pressure, the injection systems exhibit Type 3 phase behavior. In Type 3 phase behavior there are three possible phases which can exist within certain temperature and pressure ranges. One of the phases is called the L2 phase. This phase is a liquid containing a much smaller amount of a minor component than the L1 liquid phase. This means that under certain conditions the addition of a small amount of a second compound can cause a supercritical carbon dioxide phase to condense into a higher density and higher viscosity liquid phase.

The following examples will further illustrate the novel carbon dioxide flooding of the present invention. These examples are given by way of illustration and not as limitations on the invention. Thus, it should be understood that the method and composition of the flooding medium may be varied to achieve similar results in the scope of the invention.

EXAMPLES 1-7

A capillary viscometer was constructed to measure the viscosity of carbon dioxide and carbon dioxide mixtures at elevated temperatures and pressures. Table 1 indicates viscosity and density figures for pure carbon dioxide and mixtures of carbon dioxide and additive at the specified pressures and temperatures. The last column of Table 1 represents the viscosity enhancing factor which is defined as the mixture viscosity divided by the pure carbon dioxide viscosity. Ethylene glycol gave the best viscosity enhancing results.

TABLE 1

RESULTS OF VISCOSITY MEASUREMENTS ON CARBON DIOXIDE AND POLAR COMPOUND MIXTURES

| | | | P | T | Pure $CO_2$ | | Mixture | | |
|---|---|---|---|---|---|---|---|---|---|
| Ex | Additive | Wt % | (psia) | (°F.) | (g/cm$^3$) | (cp) | (g/cm$^3$) | (cp) | $E_f$ |
| 1 | Ethylene Glycol | 2.3 | 1235 | 108 | 0.299 | 0.0235 | 0.321 | 0.093 | 4.0 |
| 2 | Ethylene Glycol | 2.3 | 2025 | 153 | 0.448 | 0.0324 | 0.485 | 0.106 | 3.3 |
| 3 | n-Hexanol | 4.0 | 1530 | 159 | 0.273 | 0.0232 | 0.282 | 0.028 | 1.2 |
| 4 | Formaldehyde | 2.8 | 1800 | 157 | 0.361 | 0.0272 | 0.386 | 0.042 | 1.5 |
| 5 | n-Butanol | 7.8 | 1299 | 99 | 0.47 | 0.040 | 0.76 | 0.090 | 2.3 |
| 6 | n-Butanol | 7.8 | 1399 | 100 | 0.61 | 0.044 | 0.76 | 0.089 | 2.0 |
| 7 | n-Butanol | 7.8 | 1641 | 98 | 0.70 | 0.059 | 0.79 | 0.096 | 1.6 |

EXAMPLES 8-17

Several correlations between density and viscosity of pure hydrocarbon compounds and mixtures were evaluated in an effort to be able to predict the carbon dioxide viscosity enhancing ability of additives. The Dean-Stiel correlation noted in Dean, D.E. and Stiel, L.I., AIChE Journal, Vol. 11, pg. 526 (1965), and the Ely-Hanley correlation noted in Ely, J.F. and Hanley, H.J.M, Industrial Engineering Chemical Fundamentals, Vol. 20(4), pg. 323-332 (1981) gave very poor viscosity estimates from density data. The viscosity predictions were especially deficient in mixtures containing compounds with disparate molecular sizes.

The Hildebrand viscocity correlation noted in Hildebrand, J.H. and Lamoreaux, R.H., Procedures of the National Academy of Sciences, Vol. 69 (11), pg. 3428-3431 (1972) gave better viscosity predictions. The Hildebrand correlation was modified to give better correlation between actual measured viscosities and predicted measured viscosities. The modified Hildebrand correlation was employed to calculate the viscosity enhancement factor of Examples 8-17 in Table 2. The density data employed as a basis for Table 2 information came from the Ph.D. Thesis by R.A. Snedeker of Princeton, previously cited. At certain temperatures and pressures methanol, propanol and octanol all gave excellent viscosity enhancing results.

TABLE 2

CARBON DIOXIDE-POLAR COMPOUND MIXTURE ENHANCEMENT FACTORS PREDICTED FROM SNEDEKER'S DENSITY DATA WITH HILDEBRAND CORRELATION

| Ex. | Additive | Wt % | T (°C.) | P (psia) | $E_f$ |
|---|---|---|---|---|---|
| 8 | Methanol | 0.73 | 35.0 | 1132 | 2.6 |
| 9 | Propanol | 2.17 | 35.0 | 1146 | 3.0 |
| 10 | Propanol | 1.22 | 35.0 | 1132 | 2.8 |
| 11 | Propanol | 1.36 | 35.0 | 1132 | 2.7 |
| 12 | Propanol | 0.14 | 35.0 | 1043 | 1.6 |
| 13 | Propanol | 0.95 | 35.0 | 1014 | 1.7 |
| 14 | Propanol | 0.95 | 35.0 | 911 | 1.1 |
| 15 | Propanol | 0.55 | 35.0 | 897 | 1.0 |
| 16 | Octanol | 2.33 | 31.6 | 1073 | 3.2 |
| 17 | Octanol | 3.75 | 31.6 | 1396 | 1.3 |

EXAMPLES 18-19

Calculated estimates of recovery efficiency were obtained for a miscible carbon dioxide flood and a miscible carbon dioxide and ethylene glycol flood for a 40 acre, 5-spot well pattern at waterflood residual oil saturation, flooded with a slug of carbon dioxide or mixture, followed by a water drive. The calculation method shown by Stalkup, Jr., F. I. *Miscible Displacement*, SPE Monograph, Appendix C (1984) was employed to generate recovery curves for the two injection scenarios. The calculation assumed a single layer reservoir and used the miscible displacement sweepout curve developed by Claridge, E.L., "Prediction of Recovery in Unstable Miscible Flooding," SPE Journal, April 1972, pg. 143-155. It was assumed that residual oil saturation to waterflooding was 0.3, residual saturation to miscible flooding was 0.05, the carbon dioxide/oil mobility ratio was 15 and the carbon dioxide additive/mobility ratio was 5. The assumed porosity, permeability, temperature and connate water saturation were 20%, 50 millidarcies, 130° F. and 25%, respectively.

Recovery curves were generated for a 0.2 pore volume slug of carbon dioxide and a 0.2 pore volume slug of increased viscosity carbon dioxide. The ultimate recovery of the carbon dioxide and ethylene glycol slug was about 18.7% of the original oil in place compared with 15.3% of the original oil in place from the same size, lower viscocity carbon dioxide slug.

Many other variations or modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an undergound hydrocarbon foundation penetrated by at least one injection well and at least one production well, consisting essentially of:
   injecting through an injection well a mixture of carbon dioxide and a polar alcohol or polar glycol additive at a temperature and pressure above the critical temperature and pressure of carbon dioxide,
   said alcohol or glycol additive having less than about 9 carbon atoms and comprising about 0.1% about 10% by weight of the injected mixture; and
   recovering hydrocarbons and other fluids at a production well.

2. The method claim 1, wherein the additive is methanol.

3. The method of claim 1, wherein the additive is ethanol.

4. The method of claim 1, wherein the additive is ethylene glycol.

5. The method of claim 1, wherein the additive comprises about 1% to about 4% by weight of the injected mixture.

6. The method of claim 1, wherein the mixture of carbon dioxide and additive is injected at conditions of temperature and pressure such that the mixture is miscible with the underground hydrocarbons.

7. The method of claim 1, wherein the mixture of carbon dioxide and additive is injected at conditions of temperature and pressure such that the mixture is conditionally miscible with the underground hydrocarbons.

8. The method of claim 1, wherein the mixture of carbon dioxide and additive is immiscible with the underground hydrocarbons.

9. A method of recovering hydrocarbons from an underground hydrocarbon formation penetrated by at least one injection well and at least one production well, consisting essentially of:
   injecting through an injection well a mixture of carbon dioxide and ethylene glycol at a temperature and pressure about the critical temperature and pressure of carbon dioxide,
   said ethylene glycol comprising about 1% to about 4% by weight of the injection mixture; and
   recovering hydrocarbons and production fluids at a production well.

* * * * *